June 22, 1954 W. H. VAN ZOEST 2,681,949

RECEIVER FOR VOICE FREQUENCY TELEGRAPH SYSTEMS

Filed Feb. 9, 1951 4 Sheets-Sheet 1

INVENTOR.

Willem Hugo Van Zoest

BY

Michael S. Striker

Attorney

June 22, 1954 W. H. VAN ZOEST 2,681,949

RECEIVER FOR VOICE FREQUENCY TELEGRAPH SYSTEMS

Filed Feb. 9, 1951 4 Sheets-Sheet 2

INVENTOR.
Willem Hugo Van Zoest
BY

June 22, 1954 W. H. VAN ZOEST 2,681,949

RECEIVER FOR VOICE FREQUENCY TELEGRAPH SYSTEMS

Filed Feb. 9, 1951 4 Sheets-Sheet 3

INVENTOR.
Willem Hugo Van Zoest
BY
Undael Sgtm(?)

June 22, 1954 W. H. VAN ZOEST 2,681,949

RECEIVER FOR VOICE FREQUENCY TELEGRAPH SYSTEMS

Filed Feb. 9, 1951 4 Sheets-Sheet 4

INVENTOR.
Willem Hugo Van Zoest
BY
[signature]

Patented June 22, 1954

2,681,949

UNITED STATES PATENT OFFICE 2,681,949

RECEIVER FOR VOICE FREQUENCY TELEGRAPH SYSTEMS

Willem Hugo Van Zoest, The Hague, Netherlands, assignor to Staatsbedrijf der Posterijen, Telegrafie en Telefonie, The Hague, Netherlands Application February 9, 1951, Serial No. 210,136

Claims priority, application Netherlands February 9, 1950

12 Claims. (Cl. 178—66)

In systems for multiplex voice frequency telegraphy (e. g. the system sponsored by the C. C. I. T., having 18 or 24 channels and a band width of 120 c./s. per channel) several filters are used. In the transmitter band pass filters are used for limiting the spectrum; in the receiver they ensure channel selection.

As these filters pass only a finite frequency band, the signals will generally undergo a distortion. Kupfmuller has shown that, when suddenly switching in an A. C. voltage, the voltage at the output of a band pass filter reaches its final value after a time $$\tau=\frac{1}{f_b} \text{ sec.}$$

($f_b$ being the band width in c./s.).

In order to permit the thus distorted signals after amplification to be applied in a regenerated form to the further telegraph equipment various receivers have been proposed, in which scanning of the distorted signal at half the signal intensity is aimed at. These attempts have only been partly successful; known receivers used for this purpose in particular have the disadvantage that the accuracy is affected by variations in the level of the incoming signals.

It is an object of the invention to provide a receiver in which the distortion is very small and within wide limits practically independent of signal level. According to the invention this aim is achieved by providing the receiver with two D. C. amplifier tubes connected in cascade, a potentiometer to the terminals of which the rectified signal is applied, a rectifying cell and a condenser, one side of which connected to one of the potentiometer terminals receives the rectified signal, the other side being connected, together with the control grid of the first D. C. amplifier tube, via the said rectifier cell to a tap on said potentiometer, the rectifier cell being thus connected that the control grid of the first D. C. amplifier tube is rapidly increased to about half the signal voltage by incoming voice frequency alternating current and that on interruption of this voice frequency alternating current, the charge on the condenser is maintained at practically half the signal voltage, so that the control grid voltage of the first D. C. amplifier tube fluctuates around an intermediate value showing positive and negative deviations approximately equal to half the rectified signal voltage and that the change from the conductive to the non-conductive condition and vice versa of the second D. C. amplifier tube takes place in the neighborhood of this intermediate value.

As the regeneration of the signals should eliminate not only the distortion, but moreover the level variations, it is desirable to make the receiver insensitive to signals of a level lying beneath a certain threshold, which signals might penetrate into the receiver due to crosstalk. Therefore another object of the invention is a receiver of the above mentioned kind, which is blocked by an auxiliary tube circuit if the level of the incoming voice frequency signal does not exceed a predetermined threshold value. By suitable retardation means this auxiliary tube circuit can easily be arranged so as to render the receiver insensitive to disturbances of short duration, even if they should exceed the said threshold value.

The invention will be explained in connection with the drawings, in which

Figure 3:
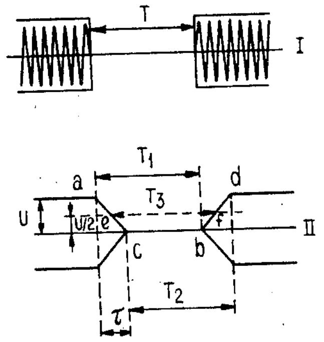
Figure 4:
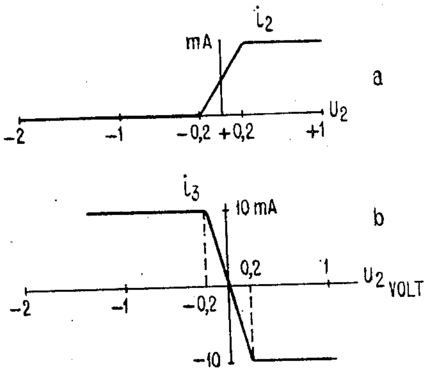

Fig. 3 relates to the theory of scanning at half signal intensity;

Fig. 4 gives two graphs concerning the embodiment of which

Figure 5:
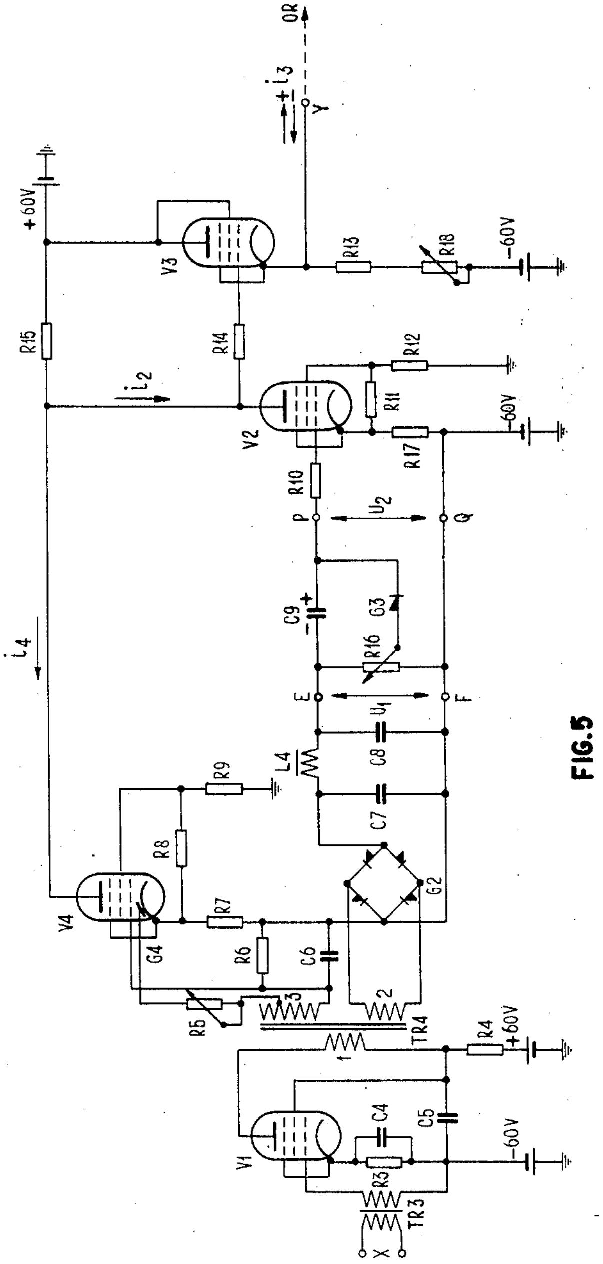
Figure 6:
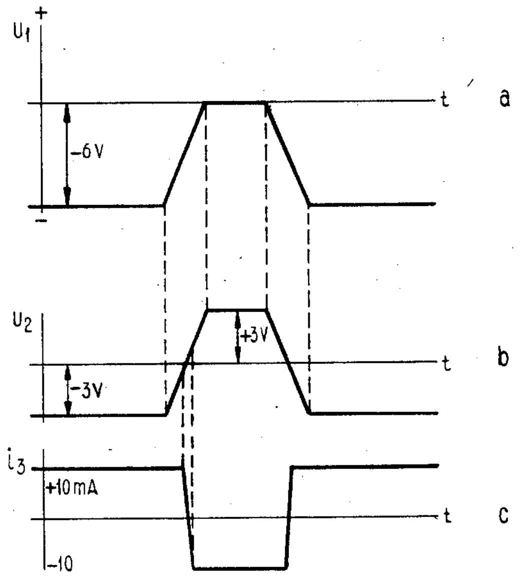
Figure 7:
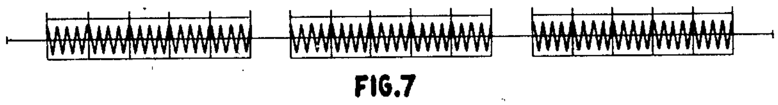
Figure 8:
Figure 9:
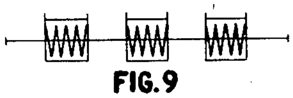
Figure 10:
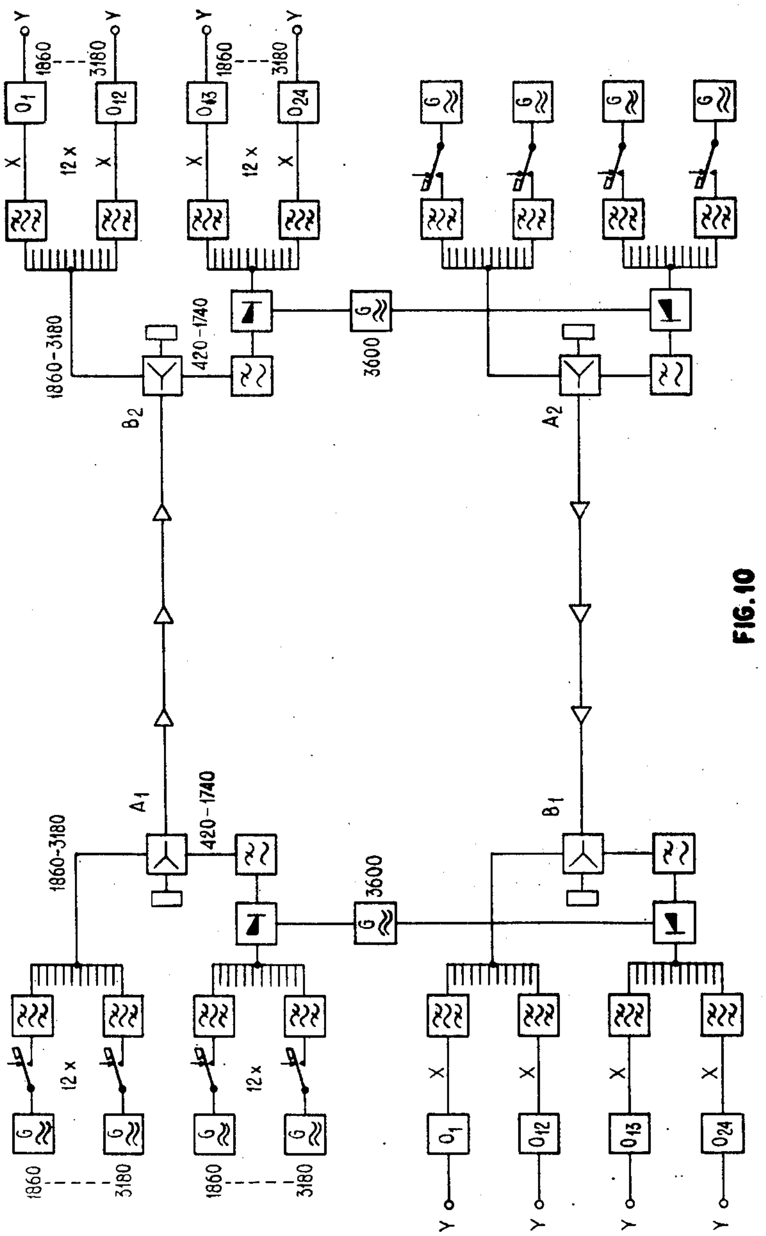

Fig. 5 shows the diagram;

Fig. 6 shows three graphs concerning the relation between the distorted and the regenerated impulse;

Figs. 7, 8 and 9 show signal types used in experiments, which serve for judging the quality of receivers of the described kind;

Fig. 10 gives a simplified block diagram for traffic in two directions on 24 voice frequency channels.

Figure 1:
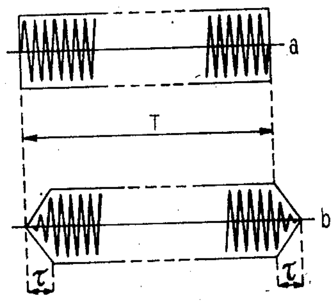
Fig. 1 shows an undistorted tone impulse as transmitted and a distorted tone impulse as received.

In Fig. 1 both the initiation and cessation of the signal are assumed to be rectilinear and to take equal lapses $\tau$ of time. The trapezium-shaped impulse $b$ is led to the receiver. The receiver should be so arranged that in this distorted signal the original impulse length T is recognized and that a D. C. impulse of length T with steep flanks is delivered to the further telegraph equipment.

Figure 2:
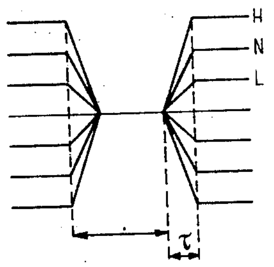
Fig. 2 shows envelopes of a distorted tone impulse at various levels.

As the attenuation between transmitter and receiver (generally a telephone circuit) is not constant (in view of the cable attenuation being dependent on temperature and due to the degree of amplification of the repeaters inserted in the circuit), the level of the impulse *b* will not be constant either (cf. Fig. 2).

In multiplex voice frequency telegraphy on wires closed circuit working is customary, that is to say that during the correspondence the spacing condition is characterized by tone, a signal being formed by interrupting this tone for a certain interval (impulse length).

Fig. 2 shows the envelopes of the received impulse (impulse length T) for three different levels: L (low), N (normal) and H (high).

It will be clear that the length of the delivered (D. C.) impulse should be independent of the magnitude of the level of the incoming A. C. impulse. A practical requirement is e. g. distortion of the length of the delivered impulse of at most 5% in the case of a level variation of the incoming impulse of + and —1.2 neper.

A correct discernment of the impulse length can be achieved in different ways (see Fig. 3).

Fig. 3 shows a transmitted no-tone impulse (I) of length T and a received impulse (II). (The extra shift between transmitted and received impulses arising from the time of propagation in the circuit between transmitter and receiver is not shown.) The impulse length in II can be found back in e. g. $T_1=T$, this being the interval between the point where the voltage begins to decrease (*a*) and the point where it begins to increase again (*b*).

In an analogous way we find $T_2=T$ between points *c* and *d*.

The actual transient phenomena are less simple than what is characterized through the trapezium shape of Fig. 3. In the actual curve points *a*, *b*, *c* and *d* are not clearly defined, so that a receiving system which responds to $T_1$ or $T_2$ will soon show distortions. A better discernment is obtained by means of $T_3$, this being the interval between points *e* and *f*, corresponding to the moments when the level is half the level of the spacing condition. With the aid of the trapezium shape shown it may be seen from simple geometrical considerations that $T_3=T$. Theoretically it can be proved that this statement holds good for an arbitray switching-in phenomenon, providing certain conditions are satisfied, which can quite well be realized in practice.

The length of $T_3$ is independent of level, so that a receiver responsive to it will always deliver the correct impulse length. In what follows the arrangement will be described of a receiver working on this principle.

The receiver has an A. C. amplifier stage with a tube $V_1$ (see Fig. 5).

The incoming voice frequency impulse which is selected by the receiving filter is applied, by means of transformer *Tr*3, to the control grid of tube V1.

The impulse amplified by this tube is rectified by means of rectifying detector G2, so as to develope a D. C. voltage $U_1$ across resistor R16, point E being negative with respect to point F.

A low pass filter, consisting of elements L4, C7 and C8 has such cut-off frequency that the envelope of the voice frequency signals is not distorted; it prevents the high ripple frequency originating from the voice frequency and introduced into the circuit by the rectifier, from reaching the D. C. amplifier.

To the tap in the middle of resistor R16, constructed as a voltage divider or a potentiometer, is connected one side of a rectifying cell G3, and to one end of R16 the first plate of a condenser C9 while the other end is kept at a voltage of —60 volts. The second plate of the condenser is connected to the other side of the rectifying cell and to point P. Point P is connected via resistor R10 to the grid of tube V2.

Tube V2 as a first D. C. amplifying tube forms together with tube V3 as a second D. C. amplifying tube a D. C. amplifier of great responsiveness. Tube V2 is biassed to the conductive position for positive grid voltages and to the non-conductive position for negative grid voltages. Resistor R15 is a voltage drop resistor in the anode circuit of V2, the anode of V2 is via R14 connected to the control grid of V3. Adjustable resistor R18 and resistor R13 connected to —60 v. are inserted in the cathode level of tube V3, enabling the arrangement to deliver double current signals via the single wire line *y* to a telegraph signal recording device, e. g. to the polarized receiving relay OR of the telegraph equipment (not shown). V3 is conductive and non-conductive in counterphase with V2.

The anode of tube V2 is connected to the anode of the auxiliary tube V4. The voice frequency signal amplified by tube V1 is applied by means of winding 3 of transformer *Tr*4 to the diode part of tube V4. The rectified and smoothed voltage developed across resistor R6 is applied to the control grid of tube V4. The direction of this D. C. voltage is such that this grid becomes negative with respect to the cathode, so that the anode current $i_4$ can be cut off.

Fig. 4 shows the anode current curve $i_2$ of tube V2 and the output current curve $i_3$ of the final stage as a function of the D. C. voltage $U_2$ between points P and Q on the assumption that tube V4 is biassed to cut-off, that is to say its anode current $i_4=0$. ($i_4$ is shown at the top of Fig. 5.) Tube V4 is biassed to cut-off in the case of normal signalling.

If a continuous A. C. voltage (spacing) is applied to transformer *Tr*3, point E will become negative with respect to point F; assuming that in the case of a certain incoming level $U_1=-6$ v., the potential of E will be —66 v.

The rectifier G3, connected to about half the value of R16, will impart a potential of —3 v. to point P with respect to point Q: $U_2$ being —3 v., the potential of point P will be —63 v.

It results from Fig. 4 that in this case $i_2=0$, as $U_2=-3$ v., and $i_3=+10$ ma.

By a correct dimensioning of R16, the pass resistance of G3 and the capacity of C9 the charging process can be made to take place rapidly.

The time constant of the combination of capacitor C9 and the blocking resistance of G3 is so large on the contrary that in case the A. C. voltage falls to zero for some time, for instance on arrival of a marking impulse, the voltage on C9 remains practically constant.

If, consequently, the $U_1$ curve is shaped as indicated in Fig. 6*a* ($U_1$ varying from —6 to 0 v.), $U_2$ will vary from —3 to +3 v. (Fig. 6*b*). The corresponding value of the output current $i_3$ according to the graph of Fig. 4*b*, is indicated in Fig. 6*c*.

It will be seen from Fig. 6 that the length of the received impulse corresponds to the length $T_3$ according to Fig. 3.

As the reversal of $i_3$ as a function of $U_2$ is effected with a very steep slope (within a few tenths of a volt, cf. Fig. 4*b*), the current $i_3$ in Fig. 6*c* will show very steep transitions.

This has the advantage that small maladjustments of relay OR will not so much affect the quality of the reception.

If the level of the incoming signal is higher $U_1$ e. g. being 8 v., C9 will be charged to 4 v., so that curve *b* of Fig. 6 will none the less be symmetrical with respect to the zero line and the $i_3$ impulse (Fig. 6*c*) in consequence, will again be of the correct length, so that the object aimed at is indeed achieved.

It may be seen from Fig. 4*b*, moreover, that within a very wide range of $U_2$ the amplitude of $i_3$ is practically independent of the magnitude of $U_2$, i. e. of the level of the incoming A. C. signal. In this way over-energizing of the receiving relay, which would jeopardize a faultless working, can be avoided. With high levels a right functioning of the receiver can be maintained until overload of tube V1 and rectifiers G2 and G3 sets in; with low levels good functioning will prove impossible in case $U_2$ is of the order of some tenths of a volt; the graph according to Fig. 4*b* is not sufficiently symmetrical with respect to $U_2$ in this range and the amplitude of $i_3$ will be too small.

If the line is free (the spacing tone being absent, so that $U_2=0$) $i_3$ would be zero as well. It is desirable, however, that the receiving relay is in this case in a fixed, predetermined position.

If for this position is chosen the position corresponding to a negative direction of $i_3$ (in accordance with C. C. I. T. Recommendation No. 861, article 23, paragraph 1), this position can be achieved by means of auxiliary tube V4. Diode rectifier G4 of this tube, fed by winding 3 on transformer Tr4 applies to tube V4 such a negative grid bias that if the lowest tone level occurs that is suitable for good reception the anode current $i_4$ is cut off. In case the level is still lower or if the clearing condition is initiated, a current $i_4$ is made to flow having on tube V3 the same effect as a positive $U_2$, causing $i_3$ to be negative.

In this way the receiving relay gets its fixed position and at the same time the receiver is provided with a threshold, i. e. in this condition no trouble is experienced on account of disturbances (crosstalk and so on) of a level lying below a threshold value.

By slightly delaying the charging of C6, notably by means of increasing R5, it may be obtained that also short disturbances of a level lying above the threshold value have no effect on the receiver.

It has been pointed out that the charging of C9 must take place rapidly; this requirement results from what follows. The telegraph system will emit tone in the spacing condition. Correct functioning is effected by having C9 charged to half the value of obtaining level.

When the system is in the clearing condition, i. e. that for a relatively long time there is no tone in the channel, it is essential when the channel is to be utilized, that the desired condition (C9 at half the signal voltage) is established as rapidly as possible. This means that at the end of the first tone impulse (duration at least 20 msec. at a telegraphic speed of 50 Bauds) the charging should be finished.

In case the charging process takes too much time this will result in distortion of the first, second, third, etc. impulse. The distortion of the first impulse will be greatest (e. g. 20%), that of the second will be smaller (e. g. 11%), that of the third e. g. 6%, and so on. The distortion depends on the type of test signal.

If as a test signal a signal is taken which has long tone and short no-tone periods, e. g. 5:1 (Fig. 7) it can be assumed that even in the case of slow charging the voltage on C9 during the first tone-impulse has reached its final value. The distortion appearing in this case will be minimum.

If subsequently the tone-no tone ratio of the test signal is reversed to 1:5 (Fig. 8), C9 will not directly be charged to the correct amount during the first tone-impulse; the result will be distortion.

In the case of an intermediate condition between these types of signal, notably a test signal with a 1:1 ratio (Fig. 9), the distortion will in general be different again.

In a normal test all the various types of signal will occur. A good system should meet the requirement that with all the types of signal occurring the distortion is as small as possible. In the described embodiment the above-mentioned effect is reduced to a minimum by rendering low the time constant of the charging circuit, formed by the combination of capacitor C9 and the pass resistance of G3.

It has been shown experimentally that with the most unfavorable type of signal (1:5) the distortion, in the voice frequency telegraph receiver according to the invention, did not exceed 5% within a range of level variation of 2.5 nepers, which contrasts favorably with the results obtained so far with apparatus previously used in the art.

As mentioned hereinabove the incoming voice frequency signal is rectified by means of G2 in order to obtain a voltage across R16 which in level as well as in shape is a copy of the envelope of the voice frequency signal.

With low voice frequencies (in the 18 or 24 channel C. C. I. T. system the carrier frequency of the lowest channel is 420 c./s.) this requirement can no longer be sufficiently met, for in this case one signal element (duration 20 msec.) contains only a few complete sinus waves. To make from this element a well smoothed D. C. signal element a low pass filter would be needed with such a low cut-off frequency, that consequently the envelope would be distorted. So in general the distortion figures of channels with the lower frequencies are larger than those of channels with the higher frequencies.

In order to avoid this difficulty only the filters needed for the upper 12 channels are employed in a 24 channel system (carrier frequencies 1860 to 3180 c./s.). The upper group of 12 channels is created by connecting the transmission filters belonging to this group in parallel (cf. Fig. 10).

In the transmitter the lower 12 channels can be formed by modulating a second group (1860–3180 c./s.) with 3600 c./s., from which 420–1740 c./s. channels result. (cf. Fig. 10.)

The two complementary groups formed in this way are passed on to the circuit by means of hybrid transformers.

In the receiver the upper 12 channels are directly connected to the associated receiving filters and receivers.

The lower group is brought, by modulation with 3600 c./s., into the frequency range of 1860–3180 c./s., after which channel selection takes place in an analogous way.

The advantage of this method is that the lowest channel frequency applied to the receiver is about 1860 c./s., with which mistakes caused by G2 are negligibly small.

A further advantage of this method is that the number of the various filters and the corresponding carrier frequency generators is approximately halved.

While I have illustrated and described what I regard to be the preferred embodiment of my invention, nevertheless it will be understood that such is merely exemplary and that numerous modifications and rearrangements may be made therein without departing from the essence of the invention, I claim:

1. A receiver for voice frequency carrier wave telegraphy having an A. C. amplifier, a rectifying detector, a potentiometer, a condenser and a rectifying cell, said potentiometer being arranged to receive the signal after A. C. amplification and rectifying detection, the first side of said condenser being connected with the signal receiving terminal of said potentiometer and the second side of said condenser being connected via said rectifying cell with a tap in the middle of said potentiometer, said rectifying cell being thus connected that incoming A. C. actuation of said receiver causes said condenser to rapidly assume a D. C. voltage equal to one half the voltage produced on the terminals of said potentiometer, said condenser voltage being maintained during signal interruptions of said A. C. actuation, and signal recording means responsive to the potential of said second condenser side.

2. A receiver as claimed in claim 1, having a D. C. amplifier tube, the control grid of said D. C. tube being connected to said second condenser side and said tube being biassed to be conductive for positive grid voltages and to the non-conductive state for negative grid voltages, the anode circuit of said D. C. tube being adapted to actuate a telegraph signal recording device.

3. A receiver as claimed in claim 1, having a first D. C. amplifying tube, and a second D. C. amplifying tube, the control grid of said first D. C. tube being connected to said second condenser side and said first tube being biassed to be conductive for positive grid voltages and non-conductive for negative grid voltages, the anode circuit of said first D. C. tube having a voltage drop resistor and the anode of said first D. C. tube being connected to the control grid of said second D. C. amplifying tube, an adjustable resistor being connected in series with the cathode of said second D. C. tube so as to bias said second tube to be conductive and non-conductive in counter-phase with the non-conductive and conductive conditions of said first D. C. amplifying tube, and a conductor being connected to said cathode of said second tube and being adapted to actuate a double current telegraph signal recording device.

4. A receiver according to claim 1, having a D. C. amplifying tube, responsive to the potential of said second side of said condenser, and an auxiliary tube connected in shunt with said D. C. amplifying tube, said auxiliary tube being responsive to input A. C. energy so as to be conductive in the absence of signal input energy of a predetermined minimum intensity during a time lapse of more than signal interruption duration.

5. A receiver according to claim 1, having in cascade arrangement a first and a second D. C. amplifying tube which are conductive and non-conductive in counterphase in response to the potential of said second side of said condenser, and an auxiliary tube connected in shunt with said first D. C. amplifying tube and being responsive to input A. C. signal energy so as to be conductive in the absence of signal input energy of a predetermined minimum intensity during a time lapse of more than signal interruption duration.

6. In a receiving circuit for voice frequency carrier wave telegraphy, in combination, means for detecting signals contained in said voice frequency carrier waves, said detecting means converting said voice frequency into a D. C. voltage; a voltage divider connected across the output of said detecting means and having a tap connected to an intermediate point of said voltage divider having a potential being substantially the arithmetic mean of the potentials of the terminals of said voltage divider connected with said D. C. voltage supplied by said detecting means; a condenser having a first terminal and a second terminal, said first terminal of said condenser being connected to one of said terminals of said voltage divider; a rectifying cell inserted between said tap of said voltage divider and said second terminal of said condenser, said condenser, during detection of said signals by said detecting means, being rapidly charged over said rectifying cell to substantially half said D. C. voltage so that said second terminal of said condenser is at a potential corresponding substantially to half said D. C. voltage, said rectifying cell interrupting the connection of said second terminal of said condenser with said tap of said voltage divider during interruptions of said signals so as to maintain substantially the charge of said condenser and so that the potential of said second terminal of said condenser fluctuates about an average value having positive and negative deviations, said average value being substantially equal to one half the rectified signal voltage; and signal recording means connected to said second terminal of said condenser and being responsive to the potential thereof.

7. In a receiving circuit for voice frequency carrier wave telegraphy, in combination, means for detecting signals contained in said voice frequency carrier waves, said detecting means converting said voice frequency into a D. C. voltage; a voltage divider connected across the output of said detecting means and having a tap connected to an intermediate point of said voltage divider having a potential being substantially the arithmetic mean of the potentials of the terminals of said voltage divider connected with said D. C. voltage supplied by said detecting means; a condenser having a first terminal and a second terminal, said first terminal of said condenser being connected to one of said terminals of said voltage divider; a rectifying cell inserted between said tap of said voltage divider and said second terminal of said condenser, said condenser, during detection of said signals by said detecting means, being rapidly charged over said rectifying cell to substantially half said D. C. voltage so that said second terminal of said condenser is at a potential corresponding substantially to half said D. C. voltage, said rectifying cell interrupting the connection of said second terminal of said condenser with said tap of said voltage divider during interruptions of said signals so as to maintain substantially the charge of said condenser and so that the potential of said second terminal of said condenser fluctuates about an average value having positive and negative deviations, said average value being substantially equal to one half the rectified signal voltage; a D. C. amplifier tube having a control grid connected to said second terminal of said condenser, said D. C. amplifier tube being biassed so as to be conductive for positive grid voltages and non-conductive for negative grid voltages; and telegraph signal recording means connected to the anode circuit of said D. C. amplifier tube.

8. In a receiving circuit for voice frequency carrier wave telegraphy, in combination, means for detecting signals contained in said voice frequency carrier waves, said detecting means converting said voice frequency into a D. C. voltage; a voltage divider connected across the output of said detecting means and having a tap connected to an intermediate point of said voltage divider having a potential being substantially the arithmetic mean of the potentials of the terminals of said voltage divider connected with said D. C. voltage supplied by said detecting means; a condenser having a first terminal and a second terminal, said first terminal of said condenser being connected to one of said terminals of said voltage divider; a rectifying cell inserted between said tap of said voltage divider and said second terminal of said condenser, said condenser, during detection of said signals by said detecting means, being rapidly charged over said rectifying cell to substantially half said D. C. voltage so that said second terminal of said condenser is at a potential corresponding substantially to half said D. C. voltage, said rectifying cell interrupting the connection of said second terminal of said condenser with said tap of said voltage divider during interruptions of said signals so as to maintain substantially the charge of said condenser and so that the potential of said second terminal of said condenser fluctuates about an average value having positive and negative deviations, said average value being substantially equal to one half the rectified signal voltage; a first D. C. amplifier tube having a control grid connected to said second terminal of said condenser, said first D. C. amplifier tube being biassed so as to be conductive for positive grid voltages and non-conductive for negative grid voltages; a second D. C. amplifier tube having a control grid and a cathode, the control grid of said second D. C. amplifier tube being connected to the anode of said first D. C. amplifier tube; an adjustable resistor being connected in series with said cathode of said second D. C. tube so as to bias said second tube to be conductive and non-conductive, respectively, in counterphase with the non-conductive and conductive conditions of said first D. C. tube; and a conductor connected to said cathode of said second D. C. tube, said conductor carrying a double current energizing a telegraph signal recording device.

9. In a receiving circuit for voice frequency carrier wave telegraphy, in combination, means for detecting signals contained in said voice frequency carrier waves, said detecting means converting said voice frequency into a D. C. voltage; a voltage divider connected across the output of said detecting means and having a tap connected to an intermediate point of said voltage divider having a potential being substantially the arithmetic mean of the potentials of the terminals of said voltage divider connected with said D. C. voltage supplied by said detecting means; a condenser having a first terminal and a second terminal, said first terminal of said condenser being connected to one of said terminals of said voltage divider; a rectifying cell inserted between said tap of said voltage divider and said second terminal of said condenser, said condenser, during detection of said signals by said detecting means, being rapidly charged over said rectifying cell to substantially half said D. C. voltage so that said second terminal of said condenser is at a potential corresponding substantially to half said D. C. voltage, said rectifying cell interrupting the connection of said second terminal of said condenser with said tap of said voltage divider during interruptions of said signals so as to maintain substantially the charge of said condenser and so that the potential of said second terminal of said condenser fluctuates about an average value having positive and negative deviations, said average value being substantially equal to one half the rectified signal voltage; a D. C. amplifier tube having a control grid connected to said second terminal of said condenser, said D. C. amplifier tube being biassed so as to be conductive for positive grid voltages and non-conductive for negative grid voltages; telegraph signal recording means connected to the anode circuit of said D. C. amplifier tube; an auxiliary tube connected in shunt with said D. C. amplifier tube; and means rendering said auxiliary tube responsive to the energy supplied to the input of said detecting means so as to be conductive if the signal input energy is below a predetermined minimum level during a time lapse exceeding the duration of a signal interruption.

10. In a receiving circuit for voice frequency carrier wave telegraphy, in combination, means for detecting signals contained in said voice frequency carrier waves, said detecting means converting said voice frequency into a D. C. voltage; a voltage divided connected across the output of said detecting means and having a tap connected to an intermediate point of said voltage divider having a potential being substantially the arithmetic mean of the potentials of the terminals of said voltage divider connected with said D. C. voltage supplied by said detecting means; a condenser having a first terminal and a second terminal, said first terminal of said condenser being connected to one of said terminals of said voltage divider; a rectifying cell inserted between said tap of said voltage divider and said second terminal of said condenser, said condenser, during detection of said signals by said detecting means, being rapidly charged over said rectifying cell to substantially half said D. C. voltage so that said second terminal of said condenser is at a potential corresponding substantially to half said D. C. voltage, said rectifying cell interrupting the connection of said second terminal of said condenser with said tap of said voltage divider during interruptions of said signals so as to maintain substantially the charge of said condenser and so that the potential of said second terminal of said condenser fluctuates about an average value having positive and negative deviations, said average value being substantially equal to one half the rectified signal voltage; a first D. C. amplifier tube having a control grid connected to said second terminal of said condenser, said first D. C. amplifier tube being biassed so as to be conductive for positive grid voltages and non-conductive for negative grid voltages; a second D. C. amplifier tube having a control grid and a cathode, the control grid of said second D. C. amplifier tube being connected to the anode of said first D. C. amplifier tube; an adjustable resistor being connected in series with said cathode of said second D. C. tube so as to bias said second tube to be conductive and non-conductive, respectively, in counterphase with the non-conductive and conductive conditions of said first D. C. tube; a conductor connected to said cathode of said second D. C. tube, said conductor carrying a double current energizing a telegraph signal recording device; an auxiliary tube connected in shunt with said first D. C. amplifier tube; and means rendering said auxiliary tube responsive to the energy supplied to the input of said detecting means so as to be conductive if the signal input energy is below a predetermined minimum level during a time lapse exceeding the duration of a signal interruption.

11. In a receiving circuit for voice frequency carrier wave telegraphy, in combination, means for detecting signals contained in said voice frequency carrier waves, said detecting means converting said voice frequency into a D. C. voltage; a voltage divider connected across the output of said detecting means and having a tap connected to an intermediate point of said voltage divider having a potential being substantially the arithmetic mean of the potentials of the terminals of said voltage divider connected with said D. C. voltage supplied by said detecting means; a condenser having a first terminal and a second terminal, said first terminal of said condenser being connected to one of said terminals of said voltage divider; a rectifying cell inserted between said tap of said voltage divider and said second terminal of said condenser, said condenser, during detection of said signals by said detecting means, being rapidly charged over said rectifying cell to substantially half said D. C. voltage so that said second terminal of said condenser is at a potential corresponding substantially to half said D. C. voltage, said rectifying cell interrupting the connection of said second terminal of said condenser with said tap of said voltage divider during interruptions of said signals so as to maintain substantially the charge of said condenser and so that the potential of said second terminal of said condenser fluctuates about an average value having positive and negative deviations, said average value being substantially equal to one-half the rectified signal voltage; a first D. C. amplifier tube having a control grid connected to said second terminal of said condenser, said first D. C. amplifier tube being biassed so as to be conductive for positive grid voltages and non-conductive for negative grid voltages; a second D. C. amplifier tube having a control grid and a cathode, the control grid of said second D. C. amplifier tube being connected to the anode of said first D. C. tube; a voltage drop resistor connected in the anode circuit of said first D. C. tube; an adjustable resistor being connected in series with said cathode of said second D. C. tube so as to bias said second tube to be conductive and non-conductive, respectively, in counterphase with the non-conductive and conductive conditions of said first D. C. tube; and a conductor connected to said cathode of said second D. C. tube, said conductor carrying a double current energizing a telegraph signal recording device.

12. In a receiving circuit for voice frequency carrier wave telegraphy, in combination, means for detecting signals contained in said voice frequency carrier waves, said detecting means converting said voice frequency into a D. C. voltage; a voltage divider connected across the output of said detecting means and having a tap connected to an intermediate point of said voltage divider having a potential being substantially the arithmetic mean of the potentials of the terminals of said voltage divider connected with said D. C. voltage supplied by said detecting means; a condenser having a first terminal and a second terminal, said first terminal of said condenser being connected to one of said terminals of said voltage divider; a rectifying cell inserted between said tap of said voltage divider and said second terminal of said condenser, said condenser, during detection of said signals by said detecting means, being rapidly charged over said rectifying cell to substantially half said D. C. voltage so that said second terminal of said condenser is at a potential corresponding substantially to half said D. C. vlotage, said rectifying cell interrupting the connection of said second terminal of said condenser with said tap of said voltage divider during interruptions of said signals so as to maintain substantially the charge of said condenser and so that the potential of said second terminal of said condenser fluctuates about an average value having positive and negative deviations, said average value being substantially equal to one-half the rectified signal voltage; a first D. C. amplifier tube having a control grid connected to said second terminal of said condenser, said first D. C. amplifier tube being biassed so as to be conductive for positive grid voltages and non-conductive for negative grid voltages; a second D. C. amplifier tube having a control grid and a cathode, the control grid of said second D. C. amplifier tube being connected to the anode of said first D. C. amplifier tube; a voltage drop resistor connected in the anode circuit of said first D. C. tube; an adjustable resistor being connected in series with said cathode of said second D. C. tube so as to bias said second tube to be conductive and non-conductive, respectively, in counterphase with the non-conductive and conductive conditions of said first D. C. tube; a conductor connected to said cathode of said second D. C. tube, said conductor carrying a double current energizing a telegraph signal recording device; an auxiliary tube connected in shunt with said first D. C. amplifier tube; and means rendering said auxiliary tube responsive to the energy supplied to the input of said detecting means so as to be conductive if the signal input energy is below a predetermined minimum level during a time lapse exceeding the duration of a signal interruption.

References Cited in the file of this patent

UNITED STATES PATENTS

| Number | Name | Date |
|---|---|---|
| 2,425,063 | Kahn et al. | Aug. 5, 1947 |
| 2,433,343 | Chatterjea et al. | Dec. 30, 1947 |